(No Model.)
J. W. PINKERTON.
METHOD OF AND APPARATUS FOR ROASTING COFFEE.
No. 598,813.  Patented Feb. 8, 1898.
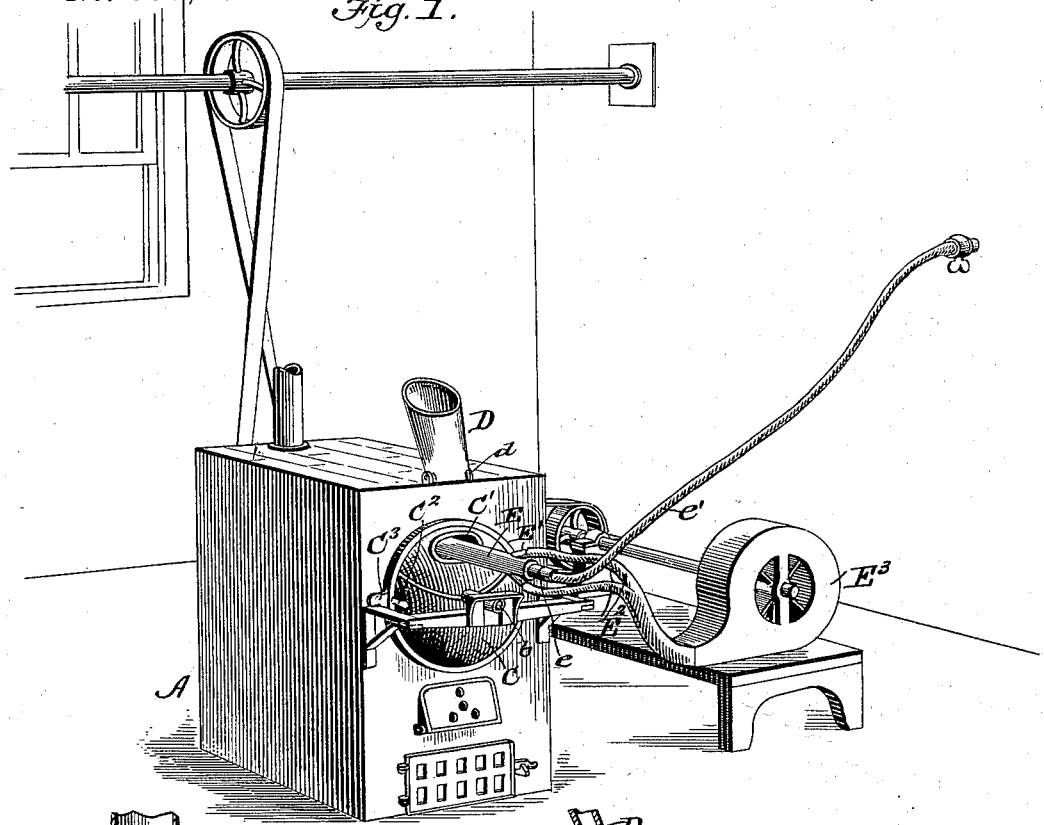
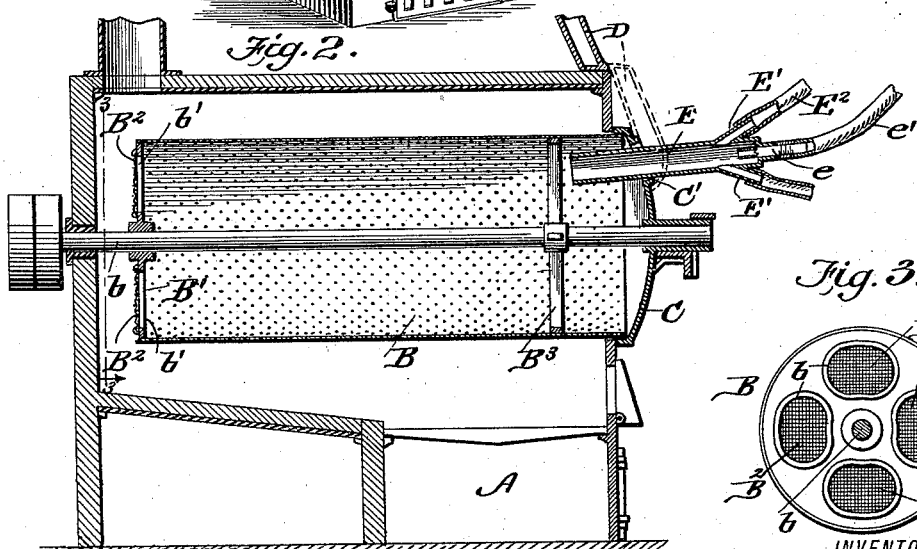
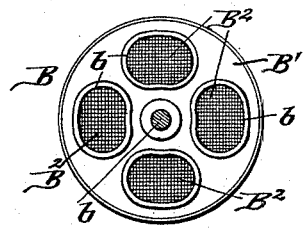
INVENTOR
John W. Pinkerton
BY
ATTORNEYS.

UNITED STATES PATENT OFFICE.

JOHN W. PINKERTON, OF ZANESVILLE, OHIO.

METHOD OF AND APPARATUS FOR ROASTING COFFEE.

SPECIFICATION forming part of Letters Patent No. 598,813, dated February 8, 1898.

Application filed November 14, 1896. Serial No. 612,068. (No model.)

*To all whom it may concern:*

Be it known that I, JOHN W. PINKERTON, of Zanesville, in the county of Muskingum and State of Ohio, have invented a new and Improved Method of and Apparatus for Roasting Coffee, of which the following is a specification.

This invention is an improved method of and apparatus for roasting coffee, and has for an object to provide a method whereby the coffee may be roasted in such manner as to retain the active properties of the coffee and to furnish an apparatus by which to roast the coffee in such manner as to retard the solubility and evaporation of the volatile and oily matters and retain the same in the bean; and the invention consists in the novel method and in the construction and combination of parts, as will be hereinafter described, and pointed out in the claims.

In the drawings, Figure 1 is a longitudinal section of a roaster constructed according to my invention. Fig. 2 is a front view thereof, and Fig. 3 is a detail view.

The furnace A constituting the active roasting agent may be of the ordinary type now used for roasting coffee, and above the firebox of this furnace I suitably support the roasting-cylinder B. This cylinder B is shown as perforated, but it may be imperforate, if desired, and it is preferably supported by the shaft $b$, journaled in suitable bearings and geared with a suitable drive mechanism, so the cylinder may be turned as the operation of roasting proceeds. The rear end plate B' of the cylinder B is provided with several openings $b'$, covered by wire-netting $B^2$, which permits the smoke, &c., to be discharged at the rear end of the cylinder. The front end of the cylinder may be closed by a hood or cap C, having an opening C' and journaled on the cylinder-shaft, so it may be turned by its handle $C^2$ to bring such opening down in position to discharge the coffee or up in position to receive a new charge of coffee or for the insertion of the burner presently described. When the hood is turned to bring the opening uppermost, the latch $C^3$ may serve to hold the hood from turning until such latch is released. A suitable lid D may be adjusted to close the opening in the hood, such lid being preferably hinged at $d$, so it may be turned into and out of closed position.

The arms $B^3$, which support the front end of the cylinder B from the shaft $b$, are set back from the front end of such cylinder, so they will not interfere with the introduction of the burner or with the turning of such cylinder when the burner is introduced.

Now I have determined by experiment that in the roasting of coffee if a hot blast be introduced directly into the roasting-cylinder at intervals as the roasting proceeds such flame will, in connection with the roasting-heat, tend to so affect the coffee-beans as to render the same when roasted richer, stronger, and higher in their aromatic qualities. This is accounted for in the fact that as the roasting proceeds a steam or vapor is generated from the moisture within the bean, and as this moisture passes off slowly it tends to dissolve and evaporate the volatile and oily matters constituting the active principles of the coffee. By introducing the hot flame into direct contact with the coffee the steam so generated is quickly burned off and is prevented thereby from carrying off the said matters from the coffee, and they are retained in the bean to the great advantage thereof, as will readily appear. It should be understood that I do not use this gas-flame as the roasting agent, such function being served by the ordinary roasting-furnace, and it should also be understood that while a gas-flame may be preferred because of its convenience and ease of handling, other flames—such, for instance, as that of an alcoholic burner—may be used, if desired. It should also be understood that the flame I use is a forced one and burns with an intense heat, so that even if its application be but momentary it will still serve the desired purpose.

In the construction shown, and as preferred, the burner E has connections E' for the air-pipes $E^2$, which lead from the blower $E^3$, and it also has a connection $e$ for the gas-pipe $e'$, which connects it with a suitable supply. The pipes $e'$ and $E^2$ are preferably flexible, so the burner E can be conveniently handled in inserting it into and removing it from the roaster. In operation it ordinarily requires from fifteen to twenty-five minutes to roast coffee, the roasting operation being sometimes effected in less than fifteen minutes and sometimes requiring more time. In my new process I usually introduce the flame about three times during the roasting operation, once at or shortly after the coffee is inserted, and afterward at regular or irregular intervals, as appear to give the best results with the coffee being treated.

My improved method involves not only the subjection of the coffee to a roasting heat, but also treating of such coffee while subject to such roasting heat to the action of a flame separate from such roasting heat and serving the purpose of quickly withdrawing from the bean the watery particles so such particles will not pass off slowly and carry with them the aromatic volatile portions or constituents of the beans. As stated before, the flame is a very hot one, and I usually secure such a flame by supplying the air from a blower, as shown, but while this is preferred it is manifest a flame of great intensity may be secured by other means without departing from some of the principles of my invention. In the operation the application of the hot flame to the coffee in the process of roasting burns up or neutralizes the moisture and steam as it evaporates from the heated coffee-beans, retarding the solubility and evaporation of the volatile and oily matters and resulting in a coffee that is richer, stronger, and much higher in aromatic qualities than that roasted by the ordinary process.

Having thus described my invention, what I claim, and desire to secure by Letters Patent, is—

1. The herein-described apparatus for use in roasting coffee which consists of the roasting-furnace, the coffee-cylinder, an opening being provided leading directly into the roasting-space for the insertion of the burner whereby the latter may be utilized to apply a flame in direct unobstructed contact with the coffee, the burner, the fuel-supply and connections between said burner and fuel-supply substantially as shown and described.

2. The herein-described apparatus for roasting coffee which consists of the roasting-furnace, the coffee-cylinder, the hood or cover for the end of said cylinder provided with an opening, and the burner movable into and out of said opening whereby a gas flame may be introduced at intervals into the coffee-cylinder as the roasting proceeds, substantially as shown and described.

3. The herein-described apparatus for use in roasting coffee, which consists of the roasting-furnace, the coffee-cylinder, an opening leading directly into the roasting-space being provided therein, for the insertion of the burner whereby a flame may be applied in direct unobstructed contact with the coffee, a blower, a gas-supply, the burner and connections between said burner and gas-supply, substantially as shown and described.

4. The method of roasting coffee which consists in subjecting such coffee to the action of a roasting heat, and directing a hot flame momentarily at intervals in direct and unobstructed contact with the coffee while it is being acted on by the roasting heat substantially as described.

JOHN W. PINKERTON.

Witnesses:
P. B. TURPIN,
SOLON C. KEMON.